(12) United States Patent
Dover et al.

(10) Patent No.: US 7,588,623 B2
(45) Date of Patent: Sep. 15, 2009

(54) STABILIZED LITHIUM METAL POWDER FOR LI-ION APPLICATION, COMPOSITION AND PROCESS

(75) Inventors: B. Troy Dover, Monroe, NJ (US); Christopher Jay Woltermann, Gastonia, NC (US); Marina Yakovleva, Gastonia, NC (US); Yuan Gao, Monroe, NJ (US); Prakash Thyaga Palepu, Gastonia, NC (US)

(73) Assignee: FMC Corporation Lithium Division, Philadelphia, PA (US)

( * ) Notice: Subject to any disclaimer, the term of this patent is extended or adjusted under 35 U.S.C. 154(b) by 145 days.

(21) Appl. No.: 11/480,606

(22) Filed: Jul. 3, 2006

(65) Prior Publication Data

US 2007/0006680 A1    Jan. 11, 2007

Related U.S. Application Data

(60) Provisional application No. 60/696,565, filed on Jul. 5, 2005.

(51) Int. Cl.
   *B22F 9/08*   (2006.01)
(52) U.S. Cl. .......................... 75/332; 75/338
(58) Field of Classification Search ........ None
   See application file for complete search history.

(56) References Cited

U.S. PATENT DOCUMENTS

| | | | |
|---|---|---|---|
| 3,271,196 A | 9/1966 | Oswin | |
| 3,508,967 A | 4/1970 | Lyall et al. | |
| 3,788,906 A * | 1/1974 | Schroeder | 149/6 |
| 4,615,959 A | 10/1986 | Hayashi et al. | |
| 4,668,595 A | 5/1987 | Yoshino et al. | |
| 4,770,697 A * | 9/1988 | Zurecki | 75/681 |
| 4,945,014 A | 7/1990 | Miyabayashi et al. | |
| 5,028,500 A | 7/1991 | Fong et al. | |
| 5,153,082 A | 10/1992 | Ogino et al. | |
| 5,162,176 A | 11/1992 | Herr et al. | |
| 5,286,582 A | 2/1994 | Tahara et al. | |
| 5,312,611 A | 5/1994 | Takami et al. | |
| 5,312,623 A | 5/1994 | Plichta et al. | |
| 5,543,021 A | 8/1996 | Yazami et al. | |
| 5,587,256 A | 12/1996 | Wilson et al. | |
| 5,672,446 A | 9/1997 | Barker et al. | |

(Continued)

FOREIGN PATENT DOCUMENTS

DE    689 10 843    8/1989

(Continued)

OTHER PUBLICATIONS

Kwon et al. "Characteristics of a lithium-polymer battery based on a lithium powder anode", *J. of Power Sources* 93:145-150 (2001).

(Continued)

*Primary Examiner*—George Wyszomierski
(74) *Attorney, Agent, or Firm*—Myers Bigel Sibley & Sajovec, PA

(57) ABSTRACT

A method of stabilizing lithium metal powder is provided. The method includes the steps of heating lithium metal to a temperature above its melting point, agitating the molten lithium metal, and contacting the lithium metal with a fluorination agent to provide a stabilized lithium metal powder.

5 Claims, 4 Drawing Sheets

U.S. PATENT DOCUMENTS

| | | | |
|---|---|---|---|
| 5,707,756 | A | 1/1998 | Inoue et al. |
| 5,725,968 | A | 3/1998 | Sato et al. |
| 5,753,387 | A | 5/1998 | Takami et al. |
| 5,753,388 | A | 5/1998 | Koksbang et al. |
| 5,807,645 | A | 9/1998 | Takeuchi et al. |
| 5,948,569 | A | 9/1999 | Moses et al. |
| 5,951,919 | A | 9/1999 | Hwang et al. |
| 5,958,622 | A | 9/1999 | Kojima et al. |
| 5,976,403 | A | 11/1999 | Dover et al. |
| 6,156,457 | A | 12/2000 | Takami et al. |
| 6,168,885 | B1 | 1/2001 | Narang et al. |
| 6,183,911 | B1 | 2/2001 | Kweon et al. |
| 6,265,110 | B1 | 7/2001 | Rao et al. |
| 6,270,926 | B1 | 8/2001 | Yamashita et al. |
| 6,387,564 | B1 | 5/2002 | Yamashita et al. |
| 6,465,126 | B1 | 10/2002 | Jannasch et al. |
| 6,541,156 | B1 | 4/2003 | Fuse et al. |
| 6,706,447 | B2 | 3/2004 | Gao et al. |
| 7,276,314 | B2 | 10/2007 | Gao et al. |
| 2002/0119373 | A1 | 8/2002 | Gao et al. |
| 2004/0002005 | A1 | 1/2004 | Gao et al. |
| 2004/0146784 | A1 | 7/2004 | Gao et al. |
| 2005/0130043 | A1 | 6/2005 | Gao et al. |

FOREIGN PATENT DOCUMENTS

| | | |
|---|---|---|
| DE | 19532626 A1 | 3/1996 |
| EP | 0 328 131 B1 | 8/1989 |
| EP | 0763865 A1 | 1/1992 |
| EP | 0573266 A1 | 6/1993 |
| EP | 0601832 A1 | 12/1993 |
| EP | 0696075 A2 | 8/1995 |
| EP | 0696075 A3 | 8/1995 |
| GB | 2383465 A | 6/2003 |
| JP | 63-13282 | 1/1988 |
| JP | 4-39859 | 2/1992 |
| JP | 4-126374 | 4/1992 |
| JP | 04190555 | 7/1992 |
| JP | 5-234621 | 9/1993 |
| JP | 10-117406 | 5/1998 |
| JP | 10-223259 | 8/1998 |
| JP | 10-270086 | 10/1998 |
| JP | 11-025975 | 1/1999 |
| JP | 2000-67853 | 3/2000 |
| JP | 2000164210 A | 6/2000 |
| WO | WO 00/13249 | 3/2000 |

OTHER PUBLICATIONS

Hong et al. "Surface Characterization of Emulsified Lithium Powder Electrode", *Electrochimica Acta* 50(2-3):535-539 (2004).

International Search Report and the Written Opinion of the International Searching Authority, or the Declaration, corresponding to International Application No. PCT/US2006/026238; mailed Dec. 18, 2006.

U.S. Appl. No. 10/900,715, filed Jul. 28, 2004, Gao et al.

U.S. Appl. No. 10/324,611, filed Dec. 20, 2002, Gao et al.

Notification of Transmittal of the International Search Report and the Written Opinion of the International Searching Authority, or the Declaration, PCT/US2004/24502, Dec. 7, 2004.

Notice to Submit Response to the Examination Report corresponding to Korean Patent Application No. 10-2002-0023709 mailed Sep. 28, 2006.

European Search Report corresponding to Great Britain application No. GB 0209424.1; Date of Mailing: Jul. 11, 2002.

Search and Examination Report corresponding to Great Britain Application No. GB0703754.2 dated Jun. 22, 2007.

Huang et al. "Electrochemical characteristics of $Sn_{1-x}Si_xO_2$ as anode for lithium-ion batteries", *J. of Power Sources* 81-82:362-367 (1999).

"WordNet Search", WordNet. Mar. 20, 2008 http://wordnet.princeton.edu.

International Programme on Chemical Safety, n-Hexane Data Sheet 0279, Apr. 2000.

European Office Action corresponding to European Patent Application No. 06786399.3 dated Nov. 5, 2008.

"Microencapsulation of Lithium", *U.S. Dept. of Commerce National Technical Information Service* (Dec. 31, 1985) 68 pages.

Supplementary Search and Examination Report corresponding to Great Britain Application No. 04779517 dated Feb. 20, 2009.

Canadian Office Action corresponding to Canadian Application No. 2384494 dated Mar. 10, 2009.

* cited by examiner

STABILIZED LITHIUM METAL POWDER FOR LI-ION APPLICATION, COMPOSITION AND PROCESS

CROSS-REFERENCE TO RELATED APPLICATION

This application claims priority to U.S. Provisional Application Ser. No. 60/696,565, filed Jul. 5, 2005, the disclosure of which is incorporated by reference in its entirety.

FIELD AND BACKGROUND OF THE INVENTION

The present invention relates to stabilized lithium metal powder ("SLMP") having better stability and a longer storage life. Such improved SLMP can be used in a wide variety of applications including organo-metal and polymer synthesis, rechargeable lithium batteries, and rechargeable lithium ion batteries. One area of interest is the use of rechargeable lithium and lithium ion batteries in electronic applications such as in cellular phones, camcorders, and laptop computers, and even more recently, in larger power applications such as in electric vehicles and hybrid electric vehicles. In these applications it is desirable that the secondary batteries have the highest specific capacity possible but still provide safe operating conditions and good cycleability so that the high specific capacity is maintained in subsequent recharging and discharging cycles.

Although there are various constructions for rechargeable lithium batteries, each construction includes a positive electrode (or cathode), a negative electrode (or anode), a separator that separates the cathode and anode, and an electrolyte in electrochemical communication with the cathode and anode. For secondary lithium batteries, lithium ions are transferred from the anode to the cathode through the electrolyte when the secondary battery is being discharged, i.e., used for its specific application. During this process, electrons are collected from the anode and pass to the cathode through an external circuit. When the secondary battery is being charged or recharged, the lithium ions are transferred from the cathode to the anode through the electrolyte.

Historically, secondary lithium batteries were produced using non-lithiated compounds having high specific capacities such as $TiS_2$, $MoS_2$, $MnO_2$ and $V_2O_5$, as the cathode active materials. These cathode active materials were coupled with a lithium metal anode. When the secondary battery was discharged, lithium ions were transferred from the lithium metal anode to the cathode through the electrolyte. Unfortunately, upon cycling, the lithium metal developed dendrites that ultimately caused unsafe conditions in the battery. As a result, the production of these types of secondary batteries was stopped in the early 1990's in favor of lithium-ion batteries.

It is known to stabilize the lithium powder, particularly for its use in secondary batteries. For example, lithium powder can be stabilized by passivating the metal powder surface with $CO_2$ such as described in U.S. Pat. Nos. 5,567,474, 5,776,369, and 5,976,403, the disclosures of which are incorporated herein in their entireties by reference. The $CO_2$ passivated lithium metal powder, however, can be used only in air with low moisture levels for a limited period of time before the lithium metal content decays because of the reaction of the lithium metal and air. Thus there remains a need for stable lithium metal with an improved storage life.

SUMMARY OF THE INVENTION

To this end, a more stable lithium powder is provided. The lithium metal powder is passivated by fluorine or fluorine-containing compounds. Such a thin, dense, continuous LiF layer provides better passivation as compared to $CO_2$ because of the solubility LiF (i.e., 0.133 g in 100 g $H_2O$ at 25° C.) is about one order of magnitude lower than that of $Li_2CO_3$ (i.e., 1.29 g in 100 g $H_2O$ at 25° C.). The LiF passivation layer is substantially smoother which provides a more continuous and denser protective passivation on the surface. The resulting lithium metal powder has improved stability and improved storage life.

These and other features and advantages of the present invention will become more readily apparent to those skilled in the art upon consideration of the following detailed description and accompanying drawing, which describe both the preferred and alternative embodiments of the present invention.

Figure 1:
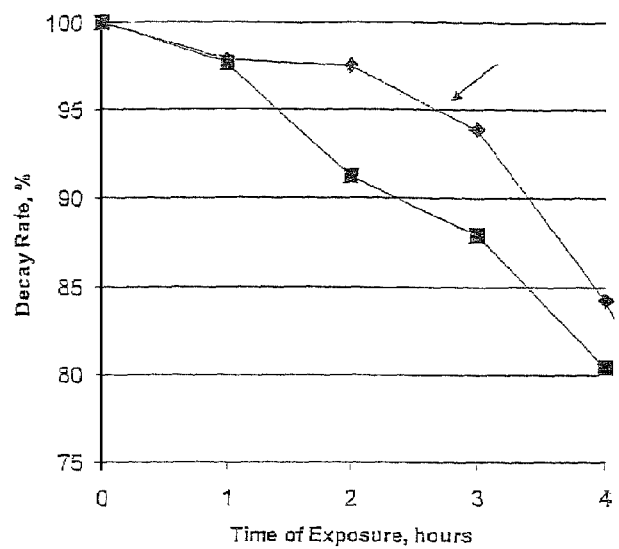
FIG. 1 is a comparison of decay rates for Example 1 and for a $CO_2$-stabilized lithium metal powder (Test A).

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawing.

DETAILED DESCRIPTION OF THE INVENTION

In accordance with the present invention, lithium dispersions are prepared by heating the lithium metal in a hydrocarbon oil to a temperature above its melting point, agitating (e.g., stirring vigorously) the molten lithium, and contacting the lithium with a fluorination agent. It is recognized that other alkali metals such as sodium and potassium can be fluorinated according to the present invention. Suitable fluorination agents may be fluorine or fluorine-containing compounds and may include fluorine gas, HF, $SiF_4$, $SnF_4$, $SF_6$ and like, perfluorocarbons such as perfluoropentylamine, perfluorohexane, perfluoro-1,3-dimethylcyclohexane; fluoro inorganic compounds such as boron tri-fluoride tert-butyl methyl etherate or tetra-fluorobic acid in diethyl ether. The fluorination agent can be introduced to contact the lithium droplets during the dispersion, or at a lower temperature after the lithium dispersion has cooled.

A variety of hydrocarbon oils, may be used in the present invention. The term hydrocarbon oil, as used herein, includes various oily liquids consisting chiefly or wholly of mixtures of hydrocarbons and includes mineral oils, i.e., liquid products of mineral origin having viscosity limits recognized for oils and hence includes but is not limited to petroleum, shale oils, paraffin oils and the like. Exemplary hydrocarbon oils are white oils (highly refined), such as, hydrocarbon oils like Peneteck manufactured by Penreco Division of Pennzoil Products Inc., which has a viscosity in the range of 43-59 pascal-sec at 100° F. and a flash point of 265° F., Parol 100 available from Penreco, Div. of Pennzoil Products, which has a viscosity of 213-236 pascal-sec at 100° F. and a flash point of 360° F. and Carnation white oil (viscosity=133-165 pascal-sec at 100° F.) made by Sonneborn Div. of Witco. Purified hydrocarbon solvents which boil in a range encompassing the melting point of lithium or sodium metal may be used, such as Unocal 140 solvent. In addition, unrefined oils, such as Unocal 460 solvent and hydrocarbon seal oil and Exxon's Telura 401 and Telura 407 may also be used. The selection of a hydrocarbon oil is within the skill of one in the art.

The process produces lithium dispersions having metal particle sizes in the range of 10 to 500 microns. It is recognized that one skilled in the art will be able to choose the appropriate particle size depending on the intended use of the lithium dispersion. On cooling, the resulting lithium dispersions are readily filtered to remove the bulk of the dispersant hydrocarbon oil and the metal can then be washed with a solvent such as hexane to remove residual oil, after which, the metal powder can be dried. The hydrocarbon oil filtrate is clear and colorless and may be recycled, without further treatment, to the metal dispersion process in contrast to the prior art processes which require clay column purification of the oil before reuse. The dried metal powders are unexpectedly stable to ambient atmosphere allowing their safe transfer in such atmospheres from one container to another.

Lithium metal used with various embodiments of the present invention may be provided as lithium powder. The lithium powder may be treated or otherwise conditioned for stability during transportation. For instance, dry lithium powder may be formed in the presence of carbon dioxide as conventionally known. It may be packaged under an inert atmosphere such as argon. The lithium powder may be formed in a suspension, such as in a suspension of mineral oil solution or other solvents. Formation of lithium powder in a solvent suspension may facilitate the production of smaller lithium metal particles. In some embodiments of the present invention, a lithium powder may be formed in a solvent that may be used with various embodiments of the present invention. The lithium metal powder formed in the solvent may be transported in the solvent. Further, the lithium metal powder and solvent mixture may be used with embodiments of the present invention, which may remove a mixing step from an electrode production process because the solvent and lithium metal powder are available as a single component. This may decrease production costs and allow the use of smaller or finer lithium metal powder particles with the embodiments of the present invention.

The lithium metal powder typically has a median particle size of 10 to 500 microns.

Alternatively the stabilized lithium metal powder can be produced by spraying the molten metal through an atomizer nozzle, and the fluorination step can take place either during the flight of the droplets in a mixture of fluorination gas and argon, or after the powder has been collected.

The stabilized lithium metal powder can be employed by itself or in combination with a dispersant agent, e.g., oleic acid. Other suitable dispersants include linoleic acid, sodium oleate, lithium oleate, linseed oil, $CO_2$, $N_2$, $NH_3$, telura oil, stearic acid, oxalic acid, tanic acid, and CO.

The stabilized lithium metal powder can be used in a secondary battery such as described in U.S. Pat. No. 6,706,447 B2, the disclosure of which is incorporated by reference in its entirety. A typical secondary battery comprises a positive electrode or cathode, a negative electrode or anode, a separator for separating the positive electrode and the negative electrode, and an electrolyte in electrochemical communication with the positive electrode and the negative electrode. The secondary battery also includes a current collector that is in electrical contact with the cathode and a current collector that is in electrical contact with the anode. The current collectors are in electrical contact with one another through an external circuit. The secondary battery can have any construction known in the art such as a "jelly roll" or stacked construction.

The cathode is formed of an active material, which is typically combined with a carbonaceous material and a binder polymer. The active material used in the cathode is preferably a material that can be lithiated at a useful voltage (e.g., 2.0 to 5.0 V versus lithium). Preferably, non-lithiated materials such as $MnO_2$, $V_2O_5$ or $MoS_2$, or mixtures thereof, can be used as the active material, and more preferably, $MnO_2$ is used. However, lithiated materials such as $LiMn_2O_4$ that can be further lithiated can also be used. The non-lithiated active materials are preferred because they generally have higher specific capacities, lower cost and broader choice than the lithiated active materials in this construction, and thus can provide increased power over secondary batteries that include lithiated active materials. Furthermore, because the anode includes lithium as discussed below, it is not necessary that the cathode include a lithiated material for the secondary battery to operate. The amount of active material provided in the cathode is preferably sufficient to accept the removable lithium metal present in the anode.

The anode is formed of a host material capable of absorbing and desorbing lithium in an electrochemical system with the stabilized lithium metal powder dispersed in the host material. For example, the lithium present in the anode can intercalate in, alloy with or be absorbed by the host material when the battery (and particularly the anode) is recharged. The host material includes materials capable of absorbing and desorbing lithium in an electrochemical system such as carbonaceous materials; materials containing Si, Sn, tin and silicon oxides or composite tin and/or silicon alloys; transition metal oxides such as CoO; lithium metal nitrides such as $Li_{3-x}Co_xN$ where $0<x<0.5$, and lithium metal oxides such as $Li_4Ti_5O_{12}$.

An alternative use of the stabilized lithium metal powder is in the preparation of organo lithium products in good yields. The thin LiF layer is believed to not retard reactivity but does protect the metal from reaction with ambient atmosphere.

The following examples are merely illustrative of the invention, and are not limiting thereon.

EXAMPLES

Two types of stabilized lithium metal powder were used to conduct stability tests. Type I powder or $CO_2$-stabilized lithium metal powder with the surface area of 0.06 $M^2/g$ (calculated based on particle size distribution) was obtained as disclosed in U.S. Pat. Nos. 5,567,474; 5,776,369 and 5,976,403.

Example 1

Battery grade lithium metal (440 grams) was cut into 2×2 inch pieces and charged under constant flow of dry argon at room temperature to a 3 liter stainless steel flask reactor with a 4" top fitted with a stirring shaft connected to a fixed high speed stirrer motor. The reactor was equipped with top and bottom heating mantles. The reactor was assembled and 1215 g of Peneteck™ oil (Penreco, Division of the Penzoil Products Company) were added. Next, the reactor was heated to about 200° C. and gentle stirring was maintained in the range of 250 rpm to 800 rpm to ensure all metal was molten. Then the mixture was stirred at high speed (up to 10,000 rpm) for 2 minutes. Oleic acid, 8.78 g was charged into the reactor and high speed stirring continued for another 3 minutes. Then the high speed stirring was stopped, the heating mantles were removed and dispersion was allowed to cool to about 100° C. Next, 32.5 grams of fluorinating agent FC70 (perfluoropentylamine) was charged into the reactor while stirring at about 800 rpm until the mixture cooled to about 45° C. The dispersion was then transferred to storage bottles. Further, lithium dispersion was filtered and washed three times with hexane in an enclosed, sintered glass filter funnel and once with n-pentane to remove the hydrocarbon-oil medium. The funnel was heated with a heat gun to remove traces of the solvents and the resulting free-flowing powder was transferred to tightly capped storage bottles.

A pyrophoricity test (Method 1050 of DOT regulations for the transport of spontaneously combustible materials, Code of Federal Regulations part 173, Appendix E) performed on this material showed it was non-pyrophoric. Physical and chemical properties for this material are shown in Table 1 below.

Type II powder or perfluoropentylamine stabilized lithium metal powder with the surface area of 0.29 $M^2/g$ (calculated based on particle size distribution) was obtained as disclosed in example 1.

Two stability tests were conducted and the decay rate, or percent decrease in metallic lithium content was analyzed as follows:

Test A: Samples were exposed to air in the ambient at a relative humidity of 40%

Test B: Samples were exposed to air in an environmental chamber with the relative humidity of 20% and constant airflow.

Test C: Samples were exposed to air in an environmental chamber at −34° C. Dow Point and constant airflow.

Figure 2:
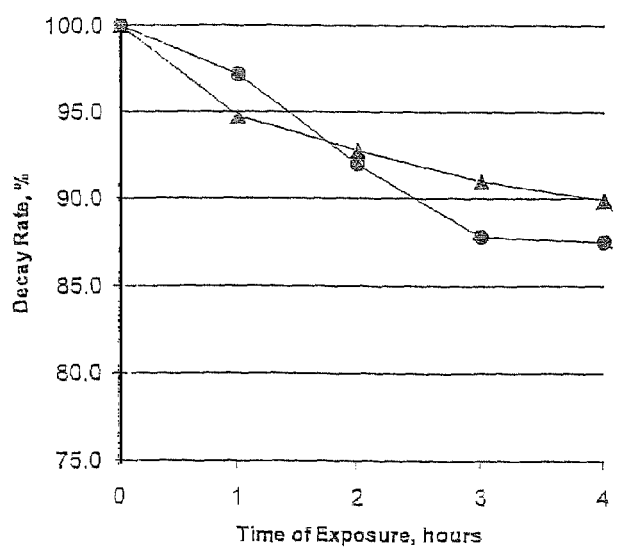
FIG. 2 is a comparison of decay rates for Example 1 and for a $CO_2$-stabilized lithium metal powder (Test B).

As seen in the FIG. 1 and FIG. 2, the perfluoropentylamine stabilized lithium metal powder with the surface area of 0.29 $M^2/g$ has smaller decay rates vs. $CO_2$-stabilized lithium metal powder with the surface area of 0.06 $M^2/g$ in spite of the surface area being almost five times higher.

Furthermore, no color change was noticed for type II powder and the nitrogen content was maintained at about 0.5% over the time of exposure indicating good passivating properties of the LiF-like coating. Black layer formation was observed for $CO_2$-stabilized samples (type I) indicating reaction with nitrogen in air in the presence of moisture. The nitrogen content increased steadily from 0.04% to 1.4% under experiment A conditions and from 0.04 to 0.7% under experiment B conditions.

Example 2

Battery grade lithium metal (439 grams) was cut into 2×2 inch pieces and charged under constant flow of dry argon at room temperature to a 3 liter stainless steel flask reactor with a 4" top fitted with a stirring shaft connected to a fixed high speed stirrer motor. The reactor was equipped with top and bottom heating mantles. The reactor was assembled and 1215 g of Peneteck™ oil were added. The reactor was then heated to about 200° C. and gentle stirring was maintained in the range of 250 rpm to 800 rpm to ensure all metal was molten. Then the mixture was stirred at high speed (up to 10,000 rpm) for 2 minutes. Oleic acid, 8.78 g was charged into the reactor and high speed stirring continued for another 3 minutes. Then the high speed stirring was stopped, the heating mantles were removed and the dispersion was allowed to cool to about 100° C. Next, 16.24 grams of perfluoropentylamine was charged into the reactor while stirring at about 800 rpm until the mixture cooled to about 45° C. The dispersion was then transferred to the storage bottles. Further, lithium dispersion was filtered and washed three times with hexane in an enclosed, sintered glass filter funnel and once with n-pentane to remove the hydrocarbon oil medium. The funnel was heated with a heat gun to remove traces of the solvents and the resulting free-flowing powder was transferred to tightly capped storage bottles. Physical and chemical properties for this material are shown in Table 1 below.

Example 3

Battery grade lithium metal (444 grams) was cut into 2×2 inch pieces and charged under constant flow of dry argon at room temperature to a 3 liter stainless steel flask reactor with a 4" top fitted with a stirring shaft connected to a fixed high speed stirrer motor. The reactor was equipped with top and bottom heating mantles. The reactor was assembled and 1218.6 g of Peneteck™ oil were added. Next, the reactor was heated to about 200° C. and gentle stirring was maintained in the range of 250 rpm to 800 rpm to ensure all metal was molten. Then the mixture was stirred at high speed (up to 10,000 rpm) for 2 minutes. Oleic acid, 4.44 g was charged into the reactor and high speed stirring continued for another 3 minutes. Then the high speed stirring was stopped, the heating mantles were removed and dispersion was allowed to cool to about 100° C. Next, 16.43 grams of perfluoropentylamine was charged into the reactor while stirring at about 800 rpm until the mixture cooled to about 45° C. The dispersion was then transferred to storage bottles. Further, lithium dispersion was filtered and washed three times with hexane in an enclosed, sintered glass filter funnel and once with n-pentane to remove the hydrocarbon oil medium. The funnel was heated with a heat gun to remove traces of the solvents and the resulting free-flowing powder was transferred to tightly capped storage bottles. Physical and chemical properties for this material are shown in Table 1 below.

TABLE 1

|  | Example 1 | Example 2 | Example 3 |
| --- | --- | --- | --- |
| D50, micron | 22.3 | 22.7 | 31.4 |
| SA, m2/g (calculated) | 0.29 | 0.29 | 0.21 |
| Metallic Li, % | 93.3 | 96.9 | 95.8 |
| F, % | 3.74 | 1.80 | 1.92 |

Figure 3:
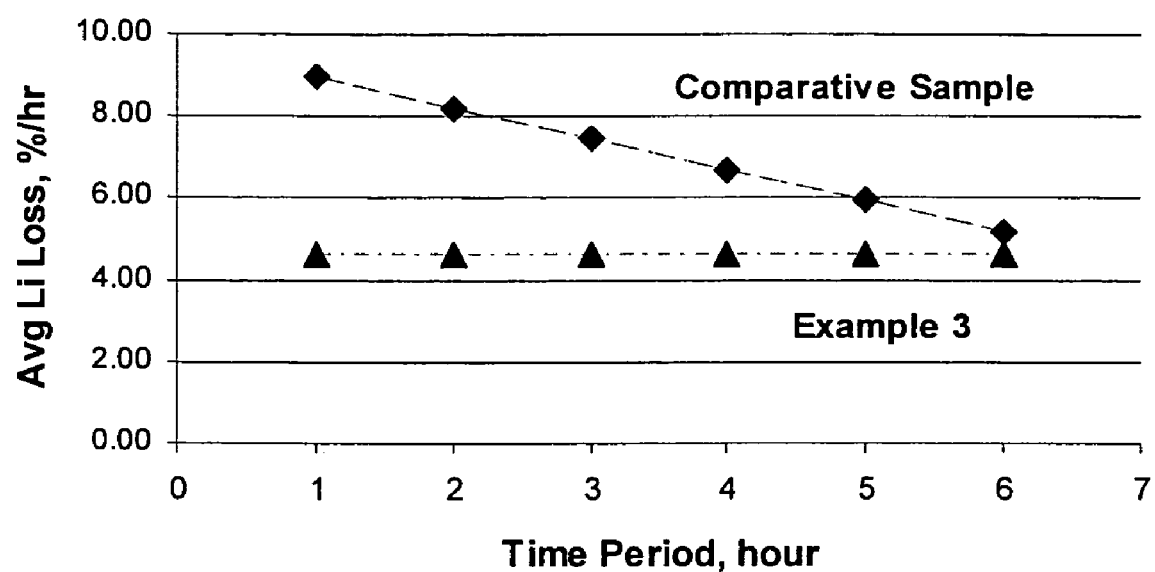
FIG. 3 is a comparison of average decay rate for Example 3 and a $CO_2$-stabilized lithium metal powder.
Figure 4:
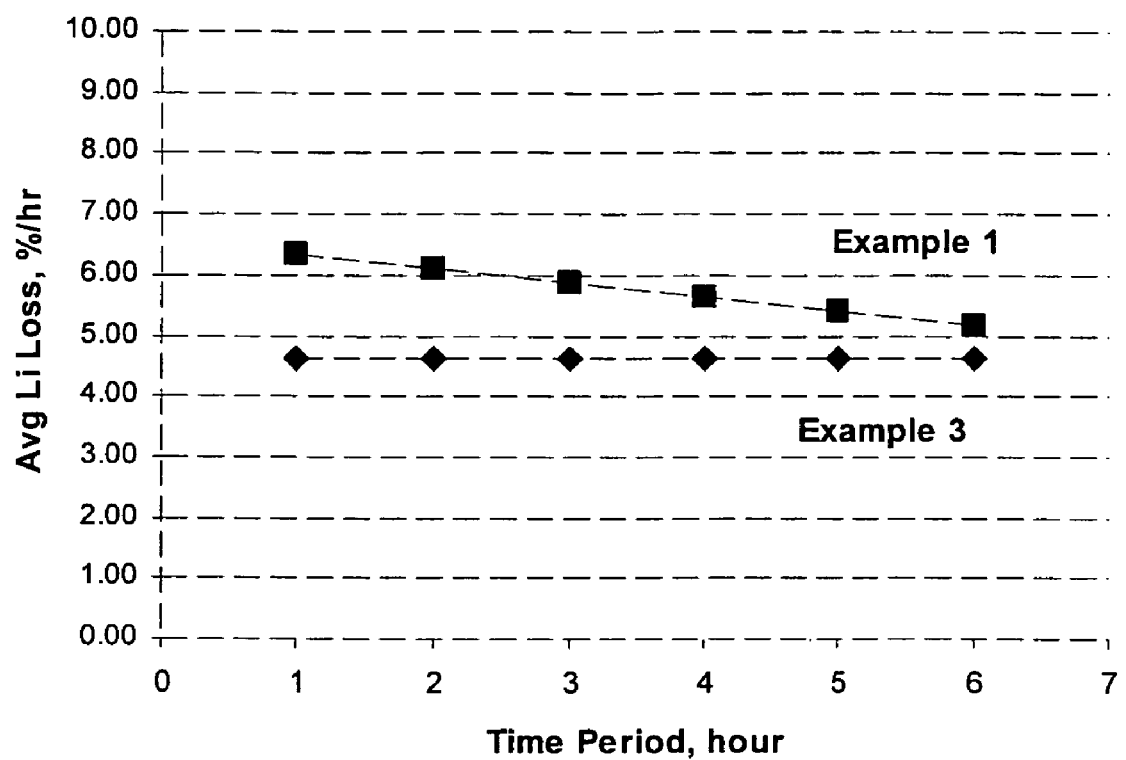
FIG. 4 is a comparison of average decay rates for Example 1 and Example 3.
Figure 5:
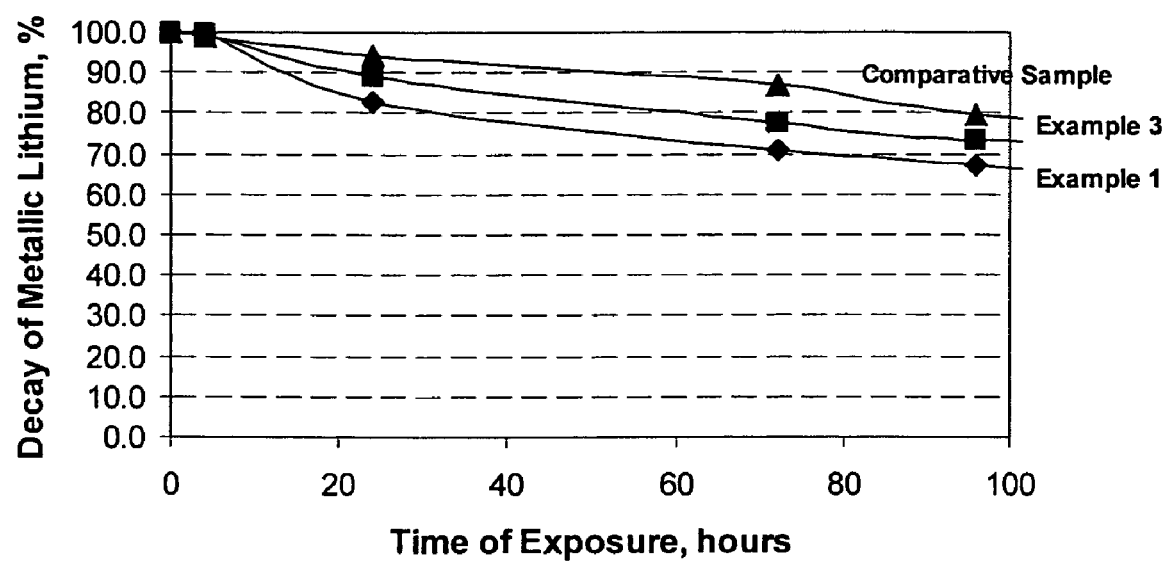
FIG. 5 is a comparison of metallic lithium content loss at −34° D.P. for Examples 1 and 3 and for a $CO_2$-stabilized lithium metal powder (Test C).

As seen in FIG. 3, the Example 3 sample has more stability than that of $CO_2$-stabilized lithium powder. As seen in FIG. 4, both samples show stability. Referring to FIG. 5, the metallic lithium content loss at −34° D.P. for Examples 1 and 3 and the Comparative Example are comparable.

Example 4

12.7 grams of 27% non-stabilized lithium dispersion in oil was placed into 120 ml hastelloy can equipped with the magnetic stirrer. Upon stirring 8.845 grams of boron tri-fluoride tert-butyl methyl etherate as a 23.9% solution in methyl tert-butyl ether was added in one shot and the temperature rise was about 278° C. The sample was allowed to cool and was transferred to a storage bottle. Further, lithium dispersion was filtered and washed three times with hexane and once with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 5

20.175 grams of 27% non-stabilized lithium dispersion in oil was placed into 1120 ml hastelloy can equipped with the magnetic stirrer. Upon stirring 0.514 grams of perfluoro-1,3,-dimethylcyclohexane was added in one shot and the temperature rise was about 60° C. and the sample was held at ~85° C. for about 1 hour. The sample was allowed to cool and was transferred to a storage bottle. Further, lithium dispersion was filtered and washed three times with hexane and once with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 6

6.472 grams of 27% non-stabilized lithium dispersion in oil was placed into 120 ml hastelloy can equipped with the magnetic stirrer. Upon stirring 37.3 mls of 8.74% solution of perfluorohexane in cyclohexane was added in 20 times excess in one shot and there was no heat of reaction observed. The sample was heated to 180° C. over a 10 hour time period. The sample was allowed to cool and transferred to a storage bottle. Further, the lithium dispersion was filtered and washed three times with hexane and once with n-pentane in an enclosed, sintered glass filter funnel to remove the hydrocarbon oil medium. The funnel was heated with a heat gun to remove traces of the solvents and the resulting free-flowing powder was transferred to tightly capped storage bottles.

Example 7

A dry 1-L 3 neck round bottom flask was equipped with mechanical stirrer, thermocouple and addition funnel with argon inlet. The flask was purged with argon and charged with lithium metal powder (20.00 g, 2.2 eq.) that had been stabilized with FC-70. Hexanes (195 g) was added and the slurry was heated to 37° C. A small amount of n-butyl chloride was added to initiate the reaction. After a few minutes, the remainder of the n-butyl chloride (121 g total) was added at such a rate as to keep the mixture at a gentle reflux. After the addition was complete, the mixture was stirred for 1 hour, then cooled and filtered. The filtration was fast and the butyl lithium solution was nearly colorless. Titration showed that the yield was typical for a low sodium dispersion.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A method of stabilizing lithium metal powder comprising the steps of:
   a) heating lithium metal to a temperature above its melting point;
   b) spraying the molten lithium metal through an atomizer nozzle to provide droplets; and
   c) fluorinating the droplets during flight to provide a stabilized lithium metal powder.

2. The method of claim 1, wherein step (a) is done in a hydrocarbon oil.

3. The method of claim 2, wherein the stabilized lithium metal powder is subjected to treatment to remove residual hydrocarbon oil.

4. The method of claim 1, wherein the lithium metal powder has a median particle size of 10 to 500 microns.

5. The method of claim 1 wherein the molten lithium metal is cooled to a temperature of 24° C. to 200° C.

* * * * *